United States Patent [19]
van Pelt et al.

[11] 3,944,680
[45] Mar. 16, 1976

[54] PREPARATION OF WHIPPABLE EMULSIONS

[75] Inventors: Johannes George van Pelt; Albertus Prins, both of Schiedam; Johannes Hendrik van Roon, Vlaardingen; Petrus Smits, Maassluis, all of Netherlands

[73] Assignee: Lever Brothers Company, New York, N.Y.

[22] Filed: July 23, 1974

[21] Appl. No.: 491,087

Related U.S. Application Data

[63] Continuation of Ser. No. 361,692, May 18, 1973, abandoned.

[30] Foreign Application Priority Data

May 8, 1973 United Kingdom............... 21939/73

[52] U.S. Cl. ............... 426/564; 426/521; 426/569; 426/570; 426/583; 426/586; 426/654; 426/656
[51] Int. Cl.² A23J 3/02; A23C 13/12; A23C 23/00
[58] Field of Search ............ 426/163, 166, 185, 356, 426/364, 33, 564, 569, 570, 572, 580, 583, 521, 586, 656, 654

[56] References Cited
UNITED STATES PATENTS

| | | | |
|---|---|---|---|
| 3,359,116 | 12/1967 | Little | 426/356 |
| 3,404,142 | 10/1968 | Shank et al. | 426/364 X |
| 3,443,960 | 5/1969 | Noznick et al. | 426/163 X |
| 3,701,669 | 10/1972 | Von Den Hoven | 426/163 |
| 3,782,971 | 1/1974 | Roon | 426/185 |
| 3,792,175 | 2/1974 | Schmitt | 426/364 |

*Primary Examiner*—David M. Naff
*Attorney, Agent, or Firm*—Lever Brothers Company

[57] ABSTRACT

Aqueous oil emulsions which can be whipped to an overrun of 70 to 500% and heat treated for microbial stability are prepared containing an aqueous phase with a pH of 4.2 to 5.5, a fat content of 3 to 50%, an emulsifier that forms a flocculate in water at the pH of the aqueous phase, such as partial fatty acid esters of polyalcohols, and a globular protein in substantial absence of coagulated protein. The globular protein may be a complex of globular protein with an anionic polysaccharide and the fat may be butter fat or vegetable fat.

4 Claims, No Drawings

PREPARATION OF WHIPPABLE EMULSIONS

This is a continuation of application Ser. No. 361,692, filed May 18, 1973, now abandoned.

The present invention relates to an aqueous oil emulsion of prolonged storage life which on whipping gives a structure comparable with whipped dairy cream. Whipped dairy cream is a product which has been known for many years and which is very much appreciated by many people. The product is usually made some time before use by whipping a liquid fresh or pasteurized dairy cream after addition of sugar and/or whipping agents. Sometimes a sterilized canned dairy cream is used which is often a semi-solid product due to fat aggregation.

Because diary cream is rather expensive, filled creams have been proposed; filled creams are creams in which milk fat is replaced partly or wholly by other fats. For this purpose hardened vegetable fats are usually proposed, because unhardened vegetable fats are usually too liquid and have a detrimental effect on the structure of the whipped product. Sometimes the product could not be whipped at all in the presence of liquid fats (see for example M. E. Schulz in Milchwissenschaft, 26 (1971) 481–6, particularly paragraph VIII, in which it is stated that foam-destroying food products are oils and fats, particularly above their melting points, and emulsions containing free fat).

In recent years two tendencies have developed in this field. The first is based on research findings indicating that polyunsaturated fatty acids (PUFA) have a favourable influence in the prevention and combatting of artherosclerosis and similar heart diseases. As a consequence manufacturers of fat-containing products are more and more developing and marketing products in which the fat contains a considerable proportion of polyunsaturated fatty acids, in particular linoleic acid. Thus, margarines, halvarines (which are margarine-like products containing about 40% fat instead of about 80% fat), and liquid coffee whiteners with a fat phase having a PUFA content of at least 40 mole % are marketed in the Netherlands. In the literature also other products with high-PUFA fats have been described, for example yoghurt and cheese. However, in the preparation of whippable creams containing high-PUFA fats, the manufacturers will encounter serious difficulties, because the higher PUFA content of the fat phase is accompanied by an increase of the proportion of liquid fat that decreases the whippability and the rigidity of the creams.

The second tendency is a result of changes in the distribution pattern of food products. In the past products such as milk, yoghurt, cream, were offered by the milkman, who delivered the products to the consumer every day. Thus the shelf-life need only be a few days. With the coming up of self-service stores, refrigerators in many houses and centralized production in a few factories a need arose for products having a longer keepability, i.e. 3–5 weeks at least at chilled cabinet temperatures (0°–10°C) but preferably at room temperature (20°–25°C). This tendency asks for preserving methods because the storage life of dairy products is often limited due to micro-biological spoilage. Because preserving agents are not permitted in many countries, theh industry has to develop sterilization or pasteurization methods to prepare products with a prolonged storage life. Some products can be sterilized without detrimental effects on their properties, such as milk, liquid coffee whiteners and custards. But sterilization of cream has not become popular, owing to the easy development of a cooked milk flavour, which is not appreciated, and to the formation of fat lumps. Another method for improving the storage life of a product is pasteurization of an acidified product. In acid products microorganisms develop less easily than in neutral products and some permitted preserving agents such as sorbic acid are only effective in acid medium. In the preparation of whippable creams pasteurization of acid creams was not possible, because it is generally known that acid creams are not or at least badly whippable if the pH is at a level of 4.9 or below (see for instance paragraph IV of the above cited review from the German dairy expert M. E. Schulz, in which it is stated that products like whipping cream, cream preparations and filled creams lose their foamability at pH values of 4.9 and below).

In general, a cream is considered whippable if with normal household mixers an overrun of at least 70–80% can be obtained. The usual overrun varies from about 140 to about 300%.

Important ingredients in the preparation of cream are proteins, because they stabilise the dispersion of fat, both in a liquid emulsion and in a whipped emulsion. However, when casein is the main protein, as in natural cream, the stabilising action of the protein is strongly decreased at a pH in the neighbourhood of its isoelectric point, i.e. at a pH of about 4–5, because then casein coagulates. This coagulate is used in the preparation of sour cream containing not more than 25% fat as described in U.S. Pat. Nos. 3,391,002, 3,355,298 and 3,359,116. It is generally known that products such as sour cream are not whippable or only whippable to a limited extent, e.g. to an overrun of about 25%, which is not comparable with the usual overrun of whipping cream (about 100–300%).

Thus up to now it has not been possible to prepare acid, protein-containing, whippable creams.

The present invention is based on the discovery that an aqueous phase containing particular emulsifiers shows a good foam formation only within a distinct pH range. This finding seems to coincide with the state of the emulsifier in the aqueous phase. The foaming properties of the system appeared to be dependent on the presence of a flocculate. It has been found that good foam formation can only be obtained if a flocculate of the emulsifier is present in the aqueous phase. It has further been found that the flocculate is not dispersed when a protein is present in the aqueous phase having a pH in the neighbourhood of the isoelectric point of the protein. It is believed that the flocculate becomes dispersed by the more ionised protein, if a protein is present in the aqueous phase having a pH further from the isoelectric point. It has not been found that a whippable, protein-containing emulsion can be made having a pH in the range of 4.2–5.5.

Thus the present invention provides an aqueous oil emulsion containing not more than 50% by weight of fat and an aqueous phase having a pH in the range of 4.2–5.5 and comprising 0.5–4% of its weight of globular protein in the substantial absence of coagulated protein and non-protein emulsifier of the type that forms a flocculate in water at the pH of the aqueous phase in an amount sufficient to retain dispersed gas when the emulsion is whipped. Both water-in-oil emulsions and oil-in-water emulsions can be prepared, but in most cases an oil-in-water emulsion is preferable.

A particular embodiment of the invention is an emulsion having a fat content of 3–25% by weight, which can be used as a low calorie cream with improved storage life and which can easily be whipped to a whipping cream having a good overrun and rigidity. In this embodiment the fat is preferably to one having a relatively high percentage of solid phase at the whipping temperature, i.e. one having an extrapolated melting dilatation of at least 1500 mm³/25g at 0°C. The dilatation of a fat is proportinal to the solids content of the fat and can be determined by the method described in H. A. Boekenoogen; Analysis and Characterisation of Oils, Fats and Fat Products; vol. I, pages 143–145 and 155–156; Interscience Publishers 1964. The preferred whipping temperature is in the range of 0°–10°C. Suitable fats are butterfat, vegetable and animal fats which are solid at room temperature, hydrogenated and/or intersterified fats, for example interesterified palm kernel oil, hydrogenated vegetable oils, having a melting point above about 30°–40° C, etc.

Another embodiment of the invention is an emulsion having a fat content of 25–50% by weight, particularly one in which the fat has a PUFA content of at least 30 mole %, i.e. at least 30% of the fatty acid radicals of the fat having two or more double bonds. In practice the major PUFA is linoleic acid. Suitable high PUFA fats are grapeseed oil, maize oil, safflower oil, soybean oil and sunflower oil. In order to improve the rigidity of the cream after whipping a small amount of so-called "hard-stock" in the fat phase of the emulsion is preferable, e.g. at least 15% by weight of the fat phase. A "hard-stock" is a relatively high melting fatty acid triglyceride having a melting point of at least 38°C. A suitable "hard-stock" is an interesterified palm kernal oil havng a melting point of 39°C.

Although whippable emulsions have been obtained in the whole pH range of 4.2–5.5, a range of 4.6–5.4 is preferably, particularly for emulsions containing a fat phase with a high PUFA content, the range of 4.7–5.0 being most preferable both for rigidity and taste of the cream. However, if the storagee life of the product should be so long as possible a pH range of 4.2–4.9 is preferable in view of better microbiological stability.

Globular proteins are proteins which form stable colloidal solutions in water in the whole pH range of 2.0–7.0, if required after addition of salt. Examples of these globular proteins are:

1. whey proteins, comprising beta-lactoglobulin, alpha-lactalbumin and serumalbumin;
2. blood serum proteins, the main constituent (about 80%) of which is blood serum albumin;
3. egg-white proteins, of which the main components are ovalbumin, conalbumin and ovumucoid (J. Sci. Fd. Agri. 17 (1966) p. 101–111);
4. soya whey proteins;
5. proteins from wheat germ; and
6. some lipoproteins, e.g. particular egg-yolk proteins.

The preferred amount of globular protein is 1.0–2.5%. Whey protein is preferable, because its heat stability is such that an emulsion containing whey protein can be pasteurized without appreciable coagulation of whey protein, and because it is a by-product in dairy manufacture having a high nutritional value which can now be used again in food manufacture. However the heat stability of whey protein and other globular proteins will be improved if at least part of the globular protein is present in the form of a complex with an anionic polysaccharide such as carrageenan, sodium alginate and carboxymethylcellulose (CMC). Because CMC is not permitted by food legislation in some countries and because the complexes of CMC and whey proteins have less buffering capacity, which is important for the taste of the product, complexes of globular proteins with anionic polysaccharides obtained from algae, such as carrageenan and sodium alginate are preferable. When very heat-sensitive globular proteins such as egg-white proteins are used, it is highly preferable if substantially all globular protein is present in the form of a complex with an anionic polysaccharide obtained from algae, but even for less heat-sensitive globular proteins the use of fully complexed globular proteins is advantageous for improving the taste of the product. When a complex of a globular protein and an anionic polysaccharide is used in an emulsion according to the present invention, that use is an embodiment of the invention described in co-pending application Ser. No. 496,782, filed Aug. 12, 1974, in which specification the preparation of the complexes is described in detail.

As stated before the presence of a substantial amount of coagulated protein, as for example in sour cream, destroys almost completely the whippability of the emulsion. Therefore, the present emulsions contain globular protein in the substantial absence of coagulated protein. However, small amounts of coagulated protein, i.e. less than about 20% by weight of the total protein content, are not harmful for the whippability.

The non-protein emulsifier is preferably present in an amount of about 0.3–2.0% by weight of the emulsion, a range of about 0.5–1.0% being most preferable. Suitable emulsifiers that form a flocculate in water at the pH of the aqueous phase are nonionic emulsifiers such as partial fatty acid esters of polyalcohols, for example glycerol and propylene glycol, and glycerolactopalmitate. Preferably a partial palmitic acid glyceride is used as an emulsifier. Both partial glycerides having a monoglyceride content of about 90% (so-called "high mono's") and partial glycerides having about equal amounts of monoglycerides and diglycerides (so-called "mono-diglycerides") can be used.

Other ingredients which are usual in cream type products can be added in appropriate amounts, if desired, for example lecithin in an amount of 0.05–0.5% by weight of the emulsion which is favourable for improving the rigidity of the whipped cream, and monosaccharides and/or disaccharides in an amount of 3–20% by weight of the emulsion which can be used for sweetening purposes. But also artificial sweeteners can be applied.

It most cases the emulsion has been pasteurised by heat in order to avoid microbiological spoilage during storage. But not for all applications are pasteurisation is necessary. For example, when the bottled cream is stored at about 0°C, or when the emulsion is whipped immediately after its preparation and the whipped cream is applied as a topping on an ice cream tart that, of course, is stored at a temperature below 0°C, the storage temperature is too low for microbiological activity and pasteurisation is not necessary.

Thus, a particular preferred embodiment of the invention is a low calorie cream, which is an aqueous oil emulsion containing:

a. 3–25% by weight of fat having an extrapolated melting dilatation of at least 1500 mm³/25g at 0°C, such as butter fat, interesterified palm kernel oil, hydrogenated fats and vegetable oils, etc.,
b. 0.5–2.0% by weight of partial fatty acid glyceride,
c. 0.05–0.5% by weight of lecithin, and
d. an aqueous phase having a pH of 4.2–5.5 and containing 3–20% by weight of the emulsion of mono- and/or disaccharides and 0.5–4% of its weight of whey protein of which at least 60% is in the form of a complex with an anionic polysaccharide obtained from algae.

Another particular preferred embodiment of the invention is a whippable high-PUFA cream, which is an aqueous oil emulsion containing:

a. 25–50% by weight of fat having a PUFA content of at least 30 mole % and containing at least 15% of its weight of a fatty acid triglyceride having a melting point of at least 38°C,
b. 0.5–2.0% by weight of partial fatty acid glyceride,
c. 0.05–0.5% by weight of lecithin, and
d. an aqueous phase having a pH of 4.2–5.5 and containing 3–20% by weight of the emulsion of mono- and/or di-saccharides, and 0.5–4% of its weight of whey protein of which at least 60% is in the form of a complex with an anionic polysaccharide obtained from algae.

A further embodiment of the invention is a whipped emulsion prepared by whippinng an aqueous oil emulsion according to the invention. Such whipping can be carried out by whipping with a conventional household or industrial mixer using air as the gas to be dispersed, but also by applying a pressurised gas such as air, nitrogen and di-nitrogen oxide, which whips the emulsion during the simultaneous release of aqueous oil emulsion and gas such as applied in aerosol-packaged creams and whipped-cream equipment in use in ice cream shops.

The aqueous oil emulsions of the present invention have the advantages that they show a good foam formation and are whippable in general within 2–3 minutes in contrast with many filled creams, i.e. creams contianing vegetable fats, which often show rather long whipping times (up to 10 minutes and more). The low pH of the emulsions gives the advantage that the storage properties of the emulsions can be made much better than for conventional dairy whipping cream, as regards microbiological stability, formation of fat lumps, viscosity, etc.

Another embodiment of the present invention is a process for the preparation of an aqueous oil emulsion contaning not more than 50% by weight of fat and an aqueous phase having a pH in the range of 4.2–5.5, which comprises:

a. preparing an aqueous phase having a pH in the range of 4.2–5.5 and containing 0.5–4% of its weight of globular protein in the substantial absence of coagulated protein, and optionally mono- and/or disaccharides in an amount of 3–20% by weight of the emulsion,
b. mixing the aqueous phase with a non-protein emulsifier of the type that forms a flocculate at the pH of the aqueous phase in an amount sufficient to retain dispersed gas when the emulsion is whipped and with a fat in an amount of 3–50% by weight of the emulsion at a temperature at which the fat is liquid, and optionally with lecithin in an amount of 0.05–0.5% by weight of the emulsion, and
c. homogenising the mixture at a temperature at which the fat is liquid.

The non-protein emulsifier and the lecithin can be added to the aqueous phase, but pre-mixing with the fat is preferable for facilitating the emulsification of the fat in case of an oil-in-water emulsion.

Usually the homogenised emulsion is pasteurised and packaged, i.e. filled into a container which is subsequently sealed. The pasteurisation can be carried out continuously or batchwise before packaging, but when the emulsion will be sold in bottles or tins it is preferable that the non-whipped emulsion is packaged and then pasteurised under conditions that the content is moving with respect to the container. With substantially all globular protein present in the form of a complex with an anionic polysaccharide obtained from algae, emulsions according to the present invention have even been sterilised successfully.

It is also possible that an emulsion is whipped and then packaged, for example when the whipped emulsion is used as a topping on a ready-to-eat dessert. In such a process the emulsion is preferabaly cooled to a temperature of 0°–10°C before whipping. If the application of the whipped cream needs pasteurisation of the product, the emulsion can be pasteurised before cooling to 0°–10°C.

The invention will be illustrated by the following Examples in which percentages and parts are by weight unless stated otherwise.

Example 1

A fat phase of 32 parts maize oil, 8 parts interesterified palm kernel oil and 1 part $C_{16}$ distilled monoglyceride was made at 60°C. An aqueous phase of 5 parts cream containing 40% milk fat, 5 parts sugar and 49 parts of a suspension of a complex of sodium alginate and non-denatured whey protein, which suspension contained 2% protein, was made at 60°C. The complex had been prepared as follows: 0.2% sodium alginate was added to cheese whey adjusted with caustic soda to a pH of 9 and dissolved while stirring for 15 minutes. Subsequently the pH was decreased to 3.0 by addition of hydrochloric acid. The precipitated complex was isolated by centrifugation.

The fat phase was emulsified in the aqueous phase and the emulsion was homogenised and pasteurised or sterilised.

After storage for 3 weeks at 5°C the cream was whipped within 3 minuted with a normal mixer and had a good rigidity and appearance. Although the pH of the whipping cream was 4.9, the product did not taste sour.

Example 2–4

These Examples relate to a recombined, low calorie dairy cream. Butterfat (obtained by melting butter and separating the fat) was mixed with 0.95% glycerol monopalmitate, 0.05% of a monoglyceride marketed under the Trade Name Myverol 18–98, and 0.1% lecithin; the percentages are by weight of the emulsion. Saccharose was added in an amount of 10% by weight of the emulsion to an aqueous phase containing 0.89% of its weight of whey protein in the form of a complex with sodium alginate and prepared as described in Example 1, and free whey protein incorporated by adding an appropriate amount of whey protein concentrate marketed under the Trade Name Foretein 35, and having a pH of 4.8. The amounts of butter fat and free whey protein, and the properties of the whipped cream are given in Table 1. The fat phase and the aqueous phase were heated to 65°–70°C, mixed and homogenised at 75 and 50 kg/cm², and the emulsion was filled into bottles which were sealed and pasteurised for 10 minutes at 90°C in such a way that the content was moving with respect to the bottle. After storing for one night at 5°C samples were whipped with a Kenwood mixer in about 3 minutes.

Examples 5–7

These Examples relate to a low calorie filled cream. The procedure is similar to that of Examples 2–4, except that butter fat was replaced by an interesterified palm kernel oil. The variable figures are given in Table 1.

TABLE 1

| Ex. | % fat | % aqueous phase before addition of saccharose | % free protein in aqueous phase | % over-run | Penetrometer value |
| --- | --- | --- | --- | --- | --- |
| 2 | 5 | 84 | 0.42 | 368 | 35 |
| 3 | 10 | 79 | 0.44 | 340 | 23 |
| 4 | 15 | 74 | 0.47 | 310 | 20.5 |
| 5 | 5 | 84 | 0.42 | 320 | >36 |
| 6 | 10 | 79 | 0.44 | 322 | 32 |
| 7 | 15 | 74 | 0.47 | 328 | 23 |

The penetrometer value was determined as the depth in mm which a cone falls into the whipped cream measured with a penetrometer. The angle of the cone is 90°, the weight is 65.6 g and the fall time is 5 seconds. A lower penetrometer value corresponds with a more rigid whipped cream. The piping properties of the whipped cream of Examples 2 and 5 were reasonable and those of Examples 3, 4, 6 and 7 were good. The rigidity of the Examples was good even after 8 hours.

Example 8

A fat phase was made by mixing 20% maize oil, 3.9% butter fat (added as butter) 5% of a hard-stock, 0.95% glycerol monopalmitate, 0.05% Myverol 18–98$^{(R)}$ and 0.1% lecithin at about 65°C. An aqueous phase (59%) containing 2.67% of its weight of free whey protein incorporated by addition of the appropriate amount of Foretein 35$^{(R)}$ was mixed with 10% saccharose. The pH of the aqueous phase was 4.8. Unless otherwise stated the percentages are by weight of the emulsion. The fat phase and the aqueous phase containing the saccharose were mixed at about 65°C and the mixture was homogenised at 75 and 50 kg/cm², filled into bottles and pasteurised (10 min/90°C). After storing for one night at 5°C a sample was whipped as described for Examples 2–7. The overrun was 208%, the whipped cream showed reasonable piping properties, but less rigidity than the creams of Examples 2–7.

Example 9

The procedure of Example 8 was repeated except that part of the whey protein was in the form of a complex with sodium alginate (0.89% whey protein in complexed form and 1.78% of free whey protein instead of 2.67% free whey protein). The overrun was 173%, the rigidity was similar too, but the piping properties of the whipped cream were slightly better than those of the cream according to Example 8. The PUFA content of the fat in Examples 8 and 9 was about 33%.

Example 10

A recombined dairy cream was made by mixing at about 60°C 30% butter, 1% glycerol monopalmitate having a monoglyceride content of more than 90%, 10% sugar, and 59% of an aqueous phase containing 1% of its weight of whey protein in the form of a complex with sodium alginate and having a pH of 4.95. The mixture was homogenised at about 60°–70°C at 175 and 100 kg/cm², filled into bottles which were sealed and pasteurised under such conditions that the content was moving with respect to the container (10 min/90°C). After storing overnight at 5°C the emulsion was whipped in 2 minutes and gave a whipped cream having a overrun of 250%, a penetrometer value of 22 and a good rigidity.

Examples 11 and 12

The procedure of Example 10 was repeated with the exception that 24% maize oil and 6% of hard-stock were used. An aqueous phase was used containing in addition 0.60% of its weight of free protein incorporated by addition of a product marketed under the Trade Name Hyfoama 68 (Example 11) or 0.54% of its weight of free protein (introduced as the product marketed as Lux-Protein Powder) (Example 12). The pH of the aqueous phase was 4.95 (Example 11) and 4.8 (Example 12).

| | Example 11 | Example 12 |
| --- | --- | --- |
| Whipping time | 4 minutes | 2 minutes |
| Overrun | 178% | 165% |
| Penetrometer value | 23.5 | 25 |
| Rigidity | good | reasonable |

The PUFA-content of the fat was about 41%.

Example 13

An edible emulsion was made following the procedure of Example 8 by mixing a fat mixture containing 20% maize oil, 5% hard-stock, 4.7% butter, 0.95% glycerol monopalmitate, 0.05% Myverol 18–98$^{(R)}$ and 0.1% lecithin with 10% saccharose and an aqueous phase containing 0.89% of its weight of whey protein in the form of a complex with sodium alginate and 1.05% of its weight of free whey protein (Foretein 34$^{(R)}$). The pH of the aqueous phase was varied from 4.3, 4.5, ... 5.5. After whipping the products having a pH within the range of 4.6–5.4 gave creams having an overrun varying from 245% to 285% and a penetrometer value varying from 32 mm to 36 mm.

Example 14

A fat phase containing 32% maize oil, 8% interesterified palm kernel oil and 0.5% monoglyceride marketed under the Trade Name Hymono SF33 and 59.5% of an aqueous phase having a pH of 4.2 containing 2% of its weight of whey protein in the form of a complex with sodium alginate were separately heated to 65°–70°C, and then mixed. The mixture was homogenised at 175 and 100 kg/cm$^2$, filled into bottles which were sealed and pasteurised at varying temperatures (70°, 80°, . . . 100°C) for 10 minutes. The products were whipped after storing overnight at 5°C. The overrun varied from 157–167%, the penetrometer value varied from 28–31 and the piping properties were good. The whipped products did not give serum drainage.

Example 15

The procedure of Example 10 was repeated with the exception that 24% maize oil and 6% of hard-stock were used instead of 30% butter. The aqueous phase contained 1% of whey protein but complexed with carrageenan instead of sodium alginate. The pH was 4.8. After whipping for 3 minutes the overrun was 194%, the penetrometer value more than 36 mm and the rigidity was rather low.

What is claimed is:

1. A process for the preparation of an aqueous oil emulsion of prolonged storage life, which can be whipped to an overrun of from 70 to 500 percent, which comprises:

a. preparing an aqueous phase having a pH in the range of 4.2 to 5.0 and containing from 0.5 to 4 percent of its weight of globular protein in the substantial absence of coagulated protein, of which globular protein at least 60 percent by weight is in the form of a complex with an anionic polysaccharide;

b. mixing the aqueous phase with an emulsifier selected from the group consisting of partial fatty acid esters of glycerol, partial fatty acid esters of propylene glycol and glycerolactopalmitate in an amount of from 0.3 to 2.0% by weight of the emulsion and with a fat in an amount of from 3 to 50 percent by weight of the emulsion at a temperature at which the fat is liquid; and, c. homogenizing the mixture at a temperature at which the fat is liquid.

2. A process according to claim 1, in which the homogenised emulsion is both pasteurised by heat and packaged.

3. A process according to claim 2, in which the non-whipped emulsion is packaged and then pasteurised under such conditions that the content is moving with respect to the container.

4. A process according to claim 1, in which the emulsion is whipped and then packaged.

* * * * *